US011750938B2

(12) United States Patent
Uchihara

(10) Patent No.: US 11,750,938 B2
(45) Date of Patent: Sep. 5, 2023

(54) IMAGE PICKUP APPARATUS THAT CAN ASSIST USER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Masato Uchihara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 17/668,914

(22) Filed: Feb. 10, 2022

(65) Prior Publication Data
US 2022/0264023 A1  Aug. 18, 2022

(30) Foreign Application Priority Data

Feb. 18, 2021  (JP) .................................. 2021-024477
Sep. 8, 2021  (JP) .................................. 2021-146277
Dec. 21, 2021  (JP) .................................. 2021-207218

(51) Int. Cl.
*H04N 23/959* (2023.01)
*H04N 23/61* (2023.01)
*H04N 23/67* (2023.01)

(52) U.S. Cl.
CPC .......... *H04N 23/959* (2023.01); *H04N 23/61* (2023.01); *H04N 23/675* (2023.01)

(58) Field of Classification Search
None
See application file for complete search history.

(56) References Cited

U.S. PATENT DOCUMENTS

| 11,062,525 B1 * | 7/2021 | Manser ..................... G06T 5/50 |
| 2011/0013039 A1 * | 1/2011 | Aisaka ................... H04N 23/61 |
| | | 348/222.1 |
| 2015/0022698 A1 * | 1/2015 | Na ........................ H04N 23/635 |
| | | 348/241 |
| 2021/0097650 A1 * | 4/2021 | Kobayashi .............. G06T 5/006 |

FOREIGN PATENT DOCUMENTS

JP  2012-244249 A  12/2012

* cited by examiner

*Primary Examiner* — Cynthia Segura
(74) *Attorney, Agent, or Firm* — Cowan, Liebowitz & Latman, P.C.

(57) ABSTRACT

An image pickup apparatus that is capable of picking up an image that effectively blurs a background easily. The image pickup apparatus including at least one processor and/or circuit configured to function as following units. A generation unit generates simulation images that simulate defocus states of background in cases that an object is picked up at different object distances based on a preliminary pickup image generated by picking up the background without including the object. A setting unit sets evaluation frames to the simulation images, respectively. A calculation unit calculates defocus-state evaluation values of the evaluation frames. A notification unit notifies of information about an object position at which the defocus state becomes optimal based on the defocus-state evaluation values.

18 Claims, 16 Drawing Sheets

*FIG. 7*

| 1 | 1 | 1 | 0 | 0 |
|---|---|---|---|---|
| 1 | 1 | 2 | 1 | 0 |
| 1 | 2 | 4 | 2 | 0 |
| 0 | 1 | 2 | 1 | 0 |
| 0 | 0 | 0 | 0 | 0 |

*FIG. 14*

| -1 | -1 | -1 |
|----|----|----|
| -1 | 8  | -1 |
| -1 | -1 | -1 |

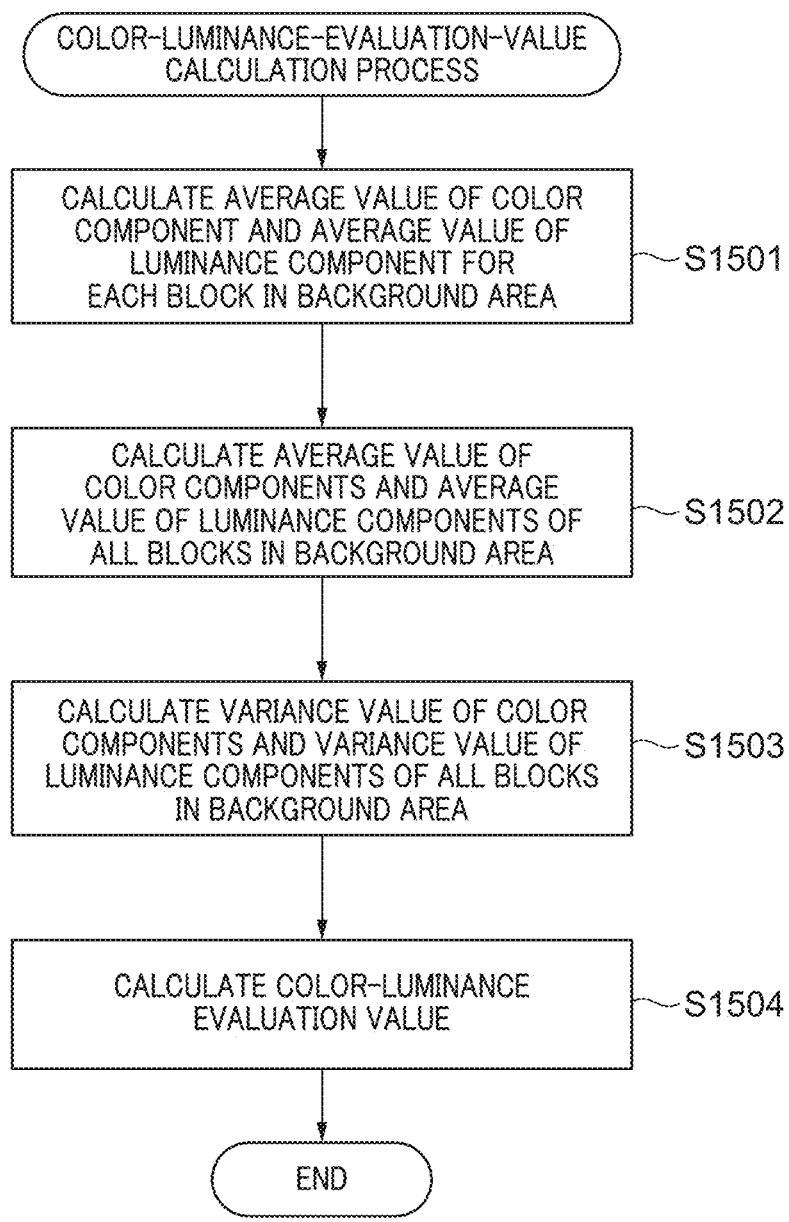

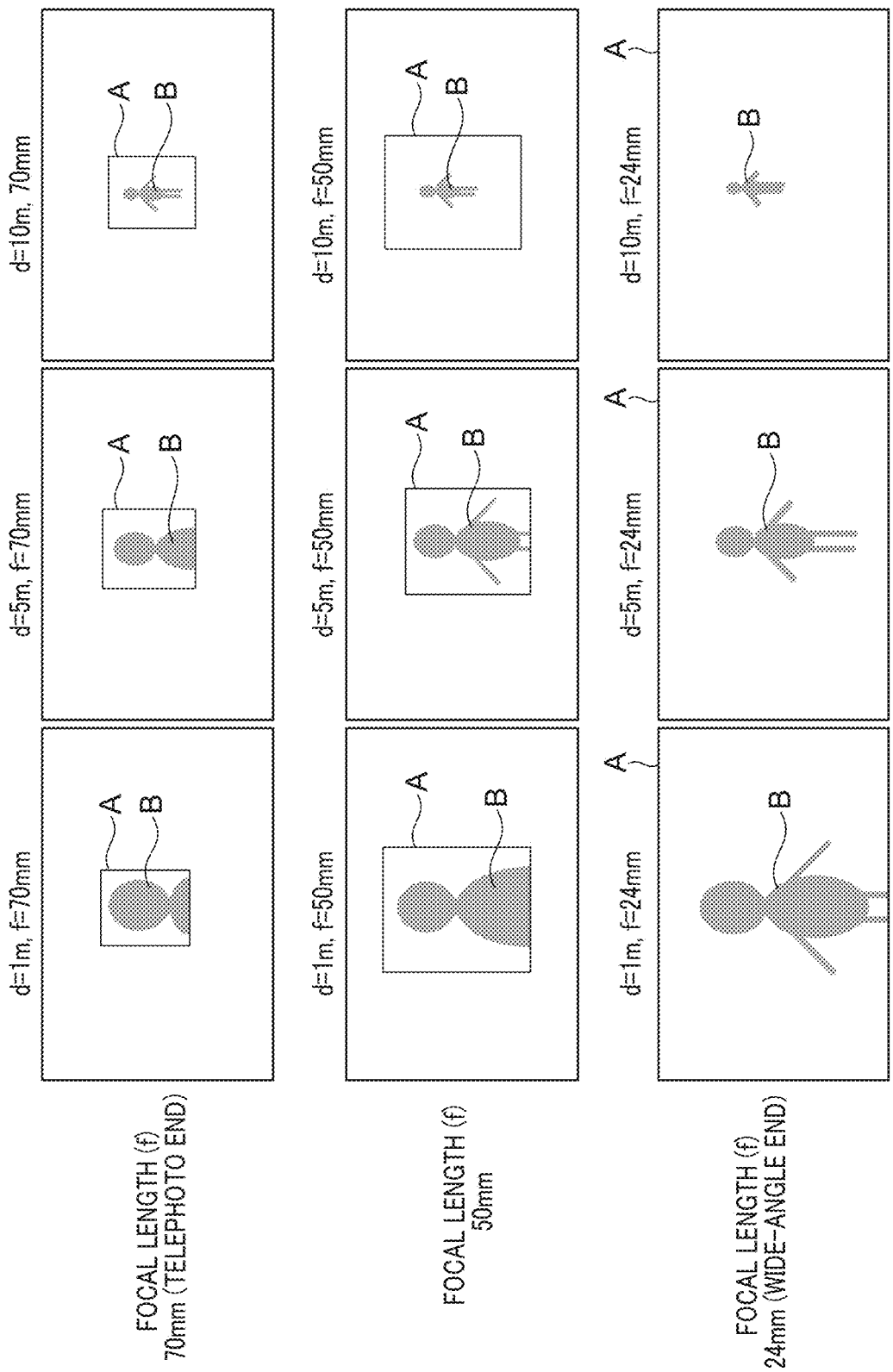

IMAGE PICKUP APPARATUS THAT CAN ASSIST USER, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus that can assist a user, a control method therefor, and a storage medium storing a control program therefor.

Description of the Related Art

There is an assist function that an image pickup apparatus like a digital camera proposes an optimal composition including an object position to a user in picking up an object like a person. Japanese Laid-Open Patent Publication (Kokai) No. 2012-244249 (JP 2012-244249A) proposes a related technique. The technique of this publication detects a position of an object area at which a positional relationship between the object area and a background object satisfies a golden section ratio by moving the object area in an image picked up beforehand. And a user is notified of the object position that achieves an optimal composition based on the detected position of the object area.

Moreover, when an image of a person as an object is picked up, there is a need to pick up a portrait that blurs a background effectively in addition to a need for the optimal composition. In order to pick up a portrait that blurs a background effectively, it is necessary to consider not only an aperture value, but also a combination of a distance from a user to an object, a distance from the user to background, and a focal length. Accordingly, it is extremely difficult to pick up a portrait that effectively blurs a background for a beginner who has little knowledge and experience in the image pickup, and a mechanism that enables a beginner to pick up such a portrait easily is required.

Since the technique of the above-mentioned publication detects the optimal object position based on only the positional relationship between the object area and the background area, the object position in consideration of the defocus state of the background is undetectable.

SUMMARY OF THE INVENTION

The present invention provides an image pickup apparatus, a control method therefor, and a storage medium storing a control program therefor, which are capable of picking up an image that effectively blurs a background easily.

Accordingly, an aspect of the present invention provides an image pickup apparatus including at least one processor and/or circuit configured to function as following units, a generation unit configured to generate simulation images that simulate defocus states of background in cases that an object is picked up at different object distances based on a preliminary pickup image generated by picking up the background without including the object, a setting unit configured to set evaluation frames to the simulation images, respectively, a calculation unit configured to calculate defocus-state evaluation values of the evaluation frames, and a notification unit configured to notify of information about an object position at which the defocus state becomes optimal based on the defocus-state evaluation values.

According to the present invention, an image that effectively blurs a background can be picked up easily.

Further features of the present invention will become apparent from the following description of exemplary embodiments with reference to the attached drawings.

BRIEF DESCRIPTION OF THE DRAWINGS

FIG. 7 is a view showing examples of filter coefficients of a defocus function used in a step S601 in the process in FIG. 6.

FIG. 14 is a view showing an example of a high-frequency-component extraction filter used in a step S1301 in FIG. 13.

FIG. 15 is a flowchart showing procedures of a color-luminance-evaluation-value calculation process executed by the optimal-object-position detection unit in FIG. 1.

FIG. 16 is a view for describing setting of the evaluation frame based on an object distance and focal length in the embodiment.

DESCRIPTION OF THE EMBODIMENTS

Figure 1:
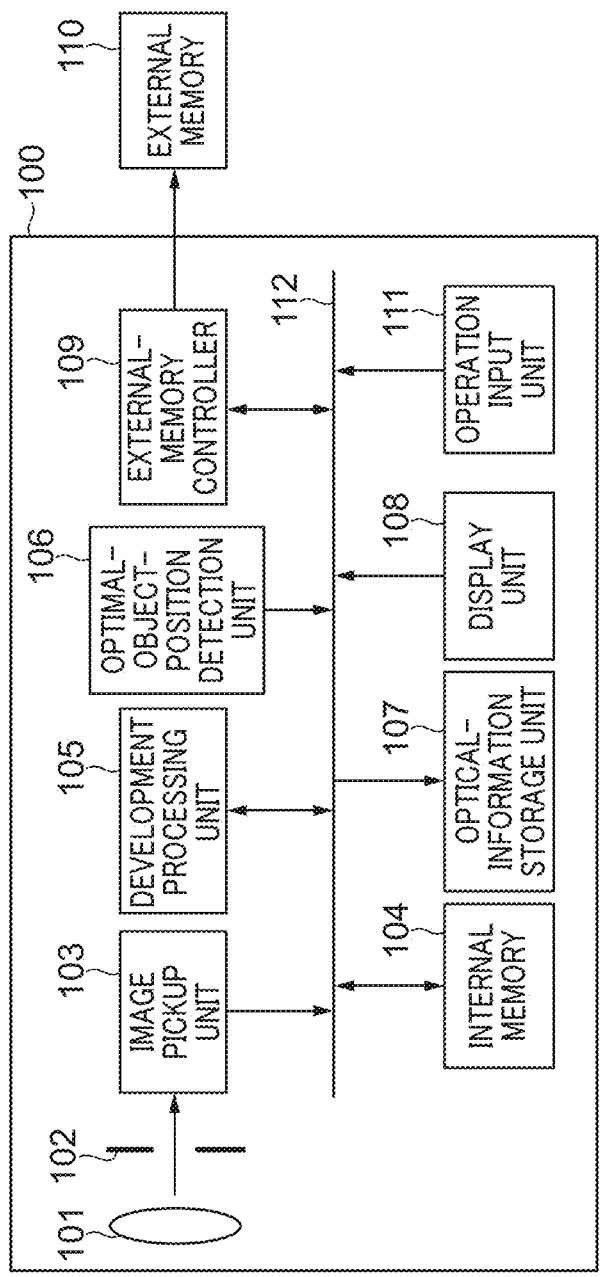
FIG. 1 is a configuration diagram schematically showing a configuration of a digital camera as an image pickup apparatus according to an embodiment of the present invention.

Hereafter, embodiments according to the present invention will be described in detail by referring to the drawings.

FIG. 1 is a configuration diagram schematically showing a configuration of a digital camera 100 as an image pickup apparatus according to an embodiment of the present invention. As shown in FIG. 1, the digital camera 100 is provided with an image pickup lens 101, a diaphragm 102, an image pickup unit 103, an internal memory 104, a development processing unit 105, an optimal-object-position detection unit 106, an optical-information storage unit 107, a display unit 108, an external-memory controller 109, and an operation input unit 111. The image pickup unit 103, internal memory 104, development processing unit 105, optimal-object-position detection unit 106, the optical-information storage unit 107, display unit 108, external-memory controller 109, and operation input unit 111 are mutually connected through a system bus 112.

The image pickup lens 101 is a lens group including a zoom lens and a focusing lens. The diaphragm 102 is used to adjust a light amount of light that enters through the image pickup lens 101. The image pickup unit 103 consists of an image sensor like a CMOS sensor that converts light entered through the image pickup lens 101 into an electrical signal and an A/D converter that converts an analog signal output from the image sensor into a digital signal. The internal memory 104 is a storage device that temporarily stores the digital signal (hereinafter referred to as "RAW image data") output from the image pickup unit 103 and post-development image data generated by the development processing unit 105. The internal memory 104 is constituted by a volatile memory like a DRAM.

The development processing unit 105 applies various image processes, such as a WB (white balance) process, a noise reduction process, and a sharpness process, to the RAW image data stored in the internal memory 104 and generates post-development image data. The generated post-development image data is stored into the internal memory 104. The optimal-object-position detection unit 106 calculates, using the post-development image data, an optimal object position at which effective defocus background is obtained. Details of the process by the optimal-object-position detection unit 106 are mentioned later. The optical-information storage unit 107 is a storage device that stores a defocus function (PSF: Point Spread Function) that is used by the optimal-object-position detection unit 106 and is mentioned later. The optical-information storage unit 107 is constituted by a nonvolatile memory like a flash ROM.

The display unit 108 is a display device that displays post-development image data and notifies a user of a detection result of the optimal-object-position detection unit 106. The display unit 108 is constituted by a liquid crystal display panel etc. The external-memory controller 109 controls writing of the RAW image data and post-development image data stored in the internal memory 104 into the external memory 110 and controls loading of data stored in the external memory 110 into the internal memory 104. The external memory 110 is a storage device that is attachable to and detachable from the digital camera 100. For example, the external memory 110 is an SD card that is constituted by a nonvolatile memory like a flash memory. The operation input unit 111 is an input device through which a user designates various operations, such as setting of an image pickup condition and display of post-development image data, to the digital camera 100. The operation input unit 111 is constituted by buttons, an electronic dial, a touch panel, etc.

Figure 2:
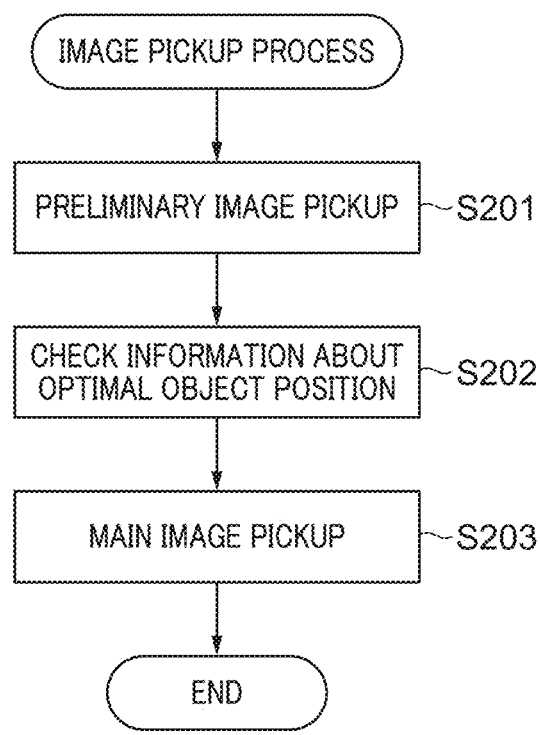
FIG. 2 is a flowchart for describing a series of flows in a case where a user picks up an image of an object using the digital camera in FIG. 1.

FIG. 2 is a flowchart for describing a series of flows in a case where a user picks up an image of an object using the digital camera 100 in FIG. 1. Hereinafter, a case where an image of a person that is an example of an object is picked up will be described.

Figure 3:
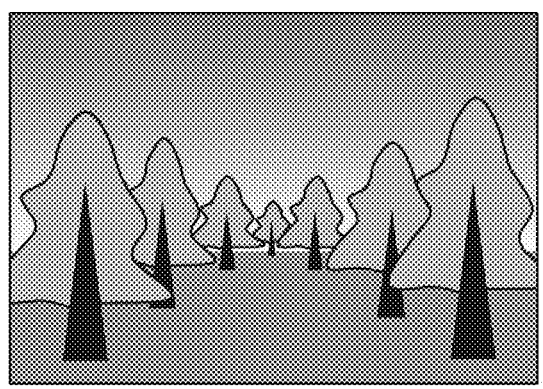
FIG. 3 is a view showing an example of a preliminary pickup image generated by the digital camera in FIG. 1.

In a step S201 in FIG. 2C, the user first performs preliminary image pickup with the digital camera 100 at a place at which the user wants to pick up an image of a person. Thereby, the digital camera 100 generates a preliminary pickup image. The preliminary pickup image is generated by picking up an image of a periphery of an image pickup target position in a state where there is no person object that will become an image pickup target. FIG. 3 shows an example of the preliminary pickup image. The preliminary pickup image is preferably picked up using a wide angle side of the zoom lens with a large aperture value so as to cover a wide area and to focus on all areas in the image (pan-focus). The optimal-object-position detection unit 106 of the digital camera 100 calculates the optimal object position using the generated preliminary pickup image by executing an optimal-object-position detection process in FIG. 6 mentioned later. The optimal object position is an object position at which a defocus state becomes optimal.

Figure 4A:
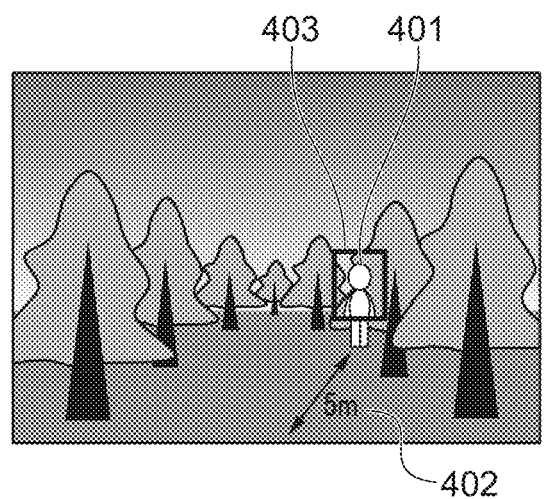
FIG. 4A and FIG. 4B are views showing image examples that are displayed in a display unit in FIG. 1.
Figure 4B:
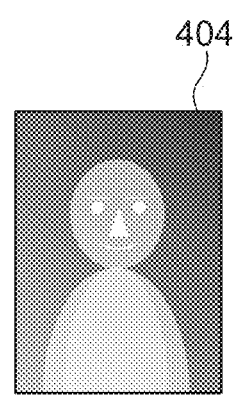

Next, in a step S202, the user checks information about the optimal object position displayed on the display unit 108. For example, as shown in FIG. 4A, the information about the optimal object position includes an object model 401 that shows an object's standing position at which the defocus state becomes optimal, object distance information 402 that shows a distance from the user to the object position, and an image-pickup field angle 403. They are displayed on the display unit 108 so as to be superimposed on the preliminary pickup image. Furthermore, an image-pickup assumption image 404 that estimates a case of picking up at the optimal object position as the information about the optimal object position is displayed on the display unit 108 as shown in FIG. 4B. Thereby, the image pickup apparatus 100 can assist the image pickup.

Figure 5A:
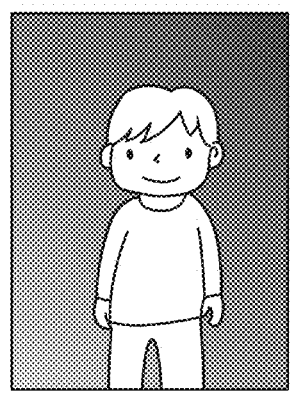
FIG. 5A and FIG. 5B are views showing examples of pickup images generated by the digital camera in FIG. 1.
Figure 5B:
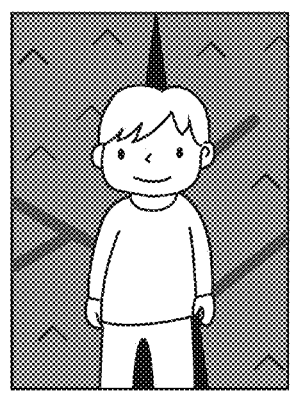

Next, the user guides a person who becomes an object to the position that is shown by the object model 401. Next, in a step S203, the user adjusts the focal length of the zoom lens to a telephoto end and performs main image pickup, i.e., picks up an actual person. Thereby, as shown in FIG. 5A, effective defocus background equivalent to the image-pickup assumption image 404 is obtained, for example. In the meantime, an example of a failure scene that does not use the present invention is shown in FIG. 5B. In the failure scene in FIG. 5B, since the background does not blur and high resolution background including branches, leaves, etc. exists around a person, an impression of a picture worsens.

Figure 6:
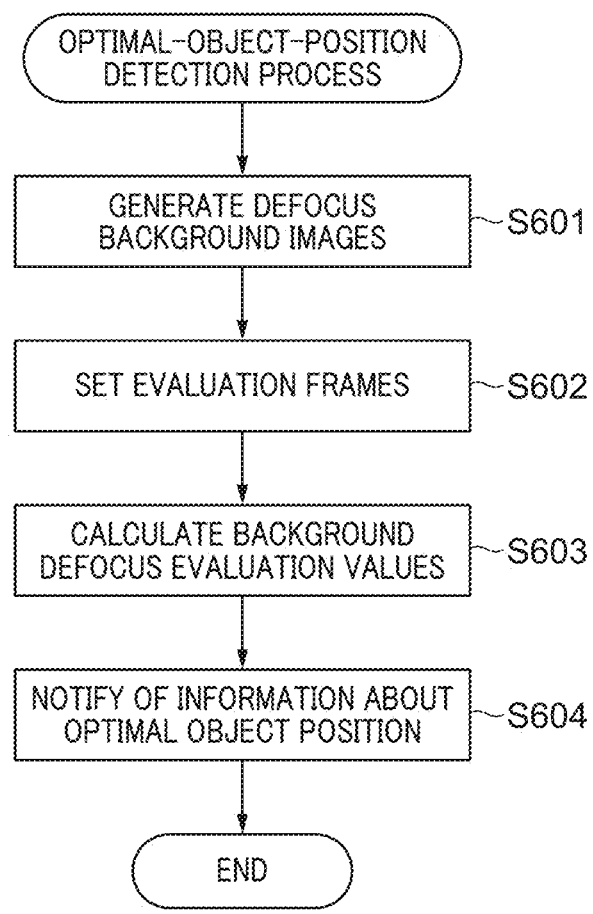
FIG. 6 is a flowchart showing procedures of an optimal-object-position detection process executed by an optimal-object-position detection unit in FIG. 1.

FIG. 6 is a flowchart showing procedures of the optimal-object-position detection process executed by the optimal-object-position detection unit 106 in FIG. 1.

In FIG. 6, the optimal-object-position detection unit 106 first generates a plurality of defocus background images (simulation images) on the basis of a preliminary pickup image in a step S601. The defocus background images simulate defocus states of the background when an object like a person is picked up at different object distances (for example, 1 m, 5 m, and 10 m) at the telephoto end of the zoom lens under a condition of the minimum aperture value. The defocus background image $I_{out}$ is calculated by the following formula (1) from the preliminary pickup image $I_{in}$.

$$I_{out}(x,y)=I_{in}(x,y) \cdot PSF(x,y) \quad (1)$$

Figure 7:
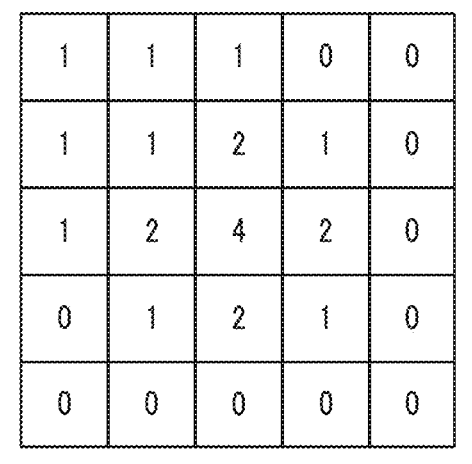
Figure 8:
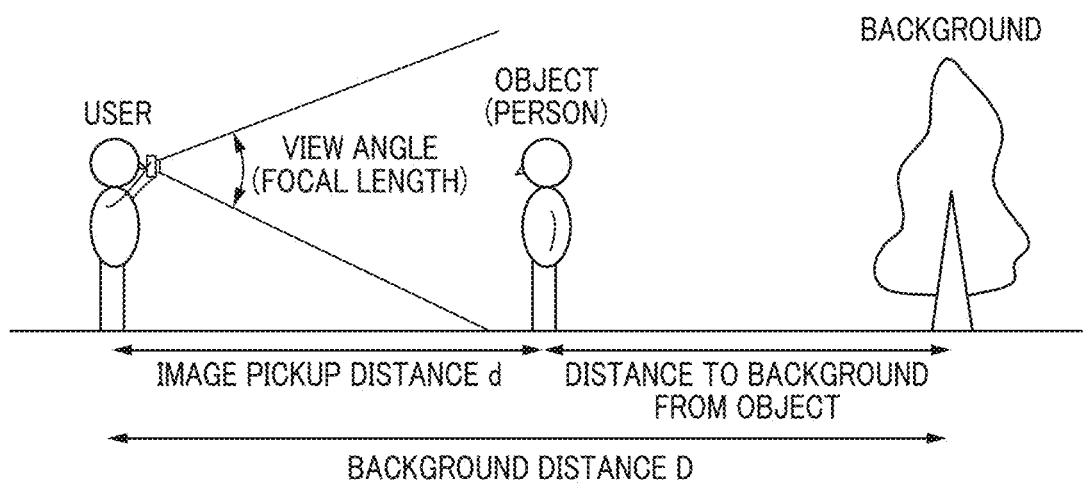
FIG. 8 is a schematic view showing distance information in picking up a person in the embodiment.

In the formula, the PSF shows the defocus function. Coordinates x and y respectively show horizontal and vertical pixel positions in the image. The defocus function PSF is expressed by a two-dimensional filter kernel as shown in FIG. 7. The defocus image $I_{out}$ is calculated as a result of convolution of the preliminary pickup image $I_{in}$ and the defocus function PSF in the respective pixel positions (x, y). As shown in FIG. 8, a distance from the user to the object (person) is an object distance d and a distance from the user to the background is a background distance D. In the embodiment, the defocus function PSF of which coefficients depend on the object distance d and background distance D is used for every pixel position of the preliminary pickup image.

Figure 9:
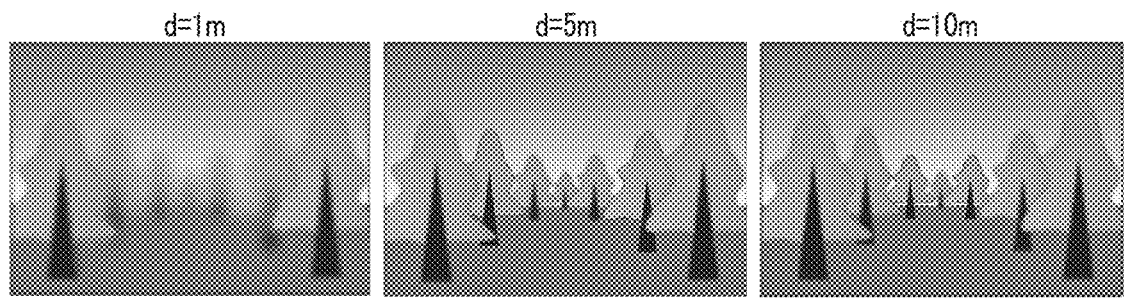
FIG. 9 is a view showing examples of defocus background images generated in the step S601 in FIG. 6.

FIG. 9 is a view showing examples of defocus background images generated in the step S601 in FIG. 6. In general, the defocus state of the background becomes larger as the object distance d becomes shorter (i.e., the distance between the object and the background becomes longer). FIG. 9 shows the images of which the object distances d are 1 m, 5 m, and 10 m. The coefficients of the defocus function PSF are held in the optical-information storage unit 107 as limited combinations of the object distances d and background distances D (as discrete points). In the step S601, the coefficient of the defocus function PSF of the condition nearest to the actual image pickup condition is used.

Moreover, the background distance D is calculated for every pixel on the basis of the defocus amount detected by using image sensors that are constituted by dividing a unit pixel. For example, the unit pixel of the image sensor is divided into two sub-pixels, and the defocus amount is detected on the basis of correlation between the image signal waveforms obtained from both the sub-pixels. And then, the object distance is found on the basis of the detection result.

Next, in a step S602, the optimal-object-position detection unit 106 sets evaluation frames to the respective defocus background images generated in the step S601 based on the image-pickup field angle of the telephoto side of the zoom lens.

Figure 10:
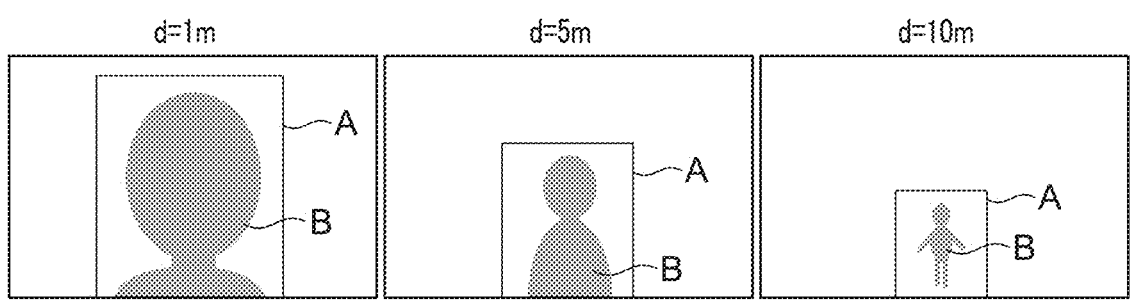
FIG. 10 is a view for describing setting of evaluation frames in a step S602 in FIG. 6.

FIG. 10 is a view for describing setting of the evaluation frames in the step S602 in FIG. 6. FIG. 10 shows setting examples of the evaluation frames of which the object distances d are 1 m, 5 m, and 10 m. Frame lines A in FIG. 10 show evaluation frames and show areas (image-pickup field angles) that are picked up at the telephoto end of the zoom lens of which the object distances d are 1 m, 5 m, and 10 m. Black painting portions B show person areas showing the person of which the object distances d are 1 m, 5 m, and 10 m. When the object distance d is 1 m, the evaluation frame A is mostly occupied by a person's face area. In this way, when the evaluation frame A is set, the person area is set within the evaluation frame based on the object distance d in the embodiment. When the object distance d is 5 m, the image-pickup field angle becomes smaller than that in the case where the object distance d is 1 m. As a result, the ratio of the person area B in the evaluation frame A becomes smaller, and the upper half of the person is included in the evaluation frame A. When the object distance d is 10 m, the size of the evaluation frame A becomes still smaller than that in the case where the object distance d is 5 m, and the whole body of the person is included in the evaluation frame A.

In the embodiment, the sizes of the evaluation frame A and the information about the person area are held in the optical-information storage unit 107 as with the PSF function for discrete points corresponding to image pickup conditions.

Figure 11:
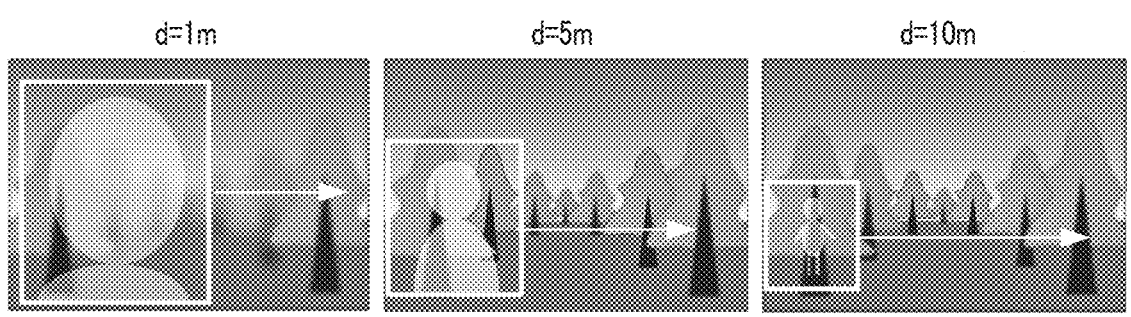
FIG. 11 is a view for describing calculation of a background-defocus evaluation value in a step S603 in FIG. 6.

Next, in a step S603, the optimal-object-position detection unit 106 calculates background defocus evaluation values E (defocus-state evaluation values) of the evaluation frames A for the defocus background images corresponding to the respective object distances d. As shown in FIG. 11, the background defocus evaluation value E is calculated at each position of the evaluation frame A while moving the evaluation frame A horizontally in the defocus background image of each object distance d. The position of the evaluation frame A of which the background defocus evaluation value E is highest and the object distance d of the defocus background image in which the evaluation frame A concerned is set represent an optimal object position. Moreover, the background defocus evaluation value E is the sum of a defocus-amount evaluation value $E_{BOKE}$ and color-luminance evaluation value $E_{CY}$.

The defocus-amount evaluation value $E_{BOKE}$ is calculated on the basis of high-frequency luminance components of blocks belonging to a background area or a boundary area of the evaluation frame A. That is, it is calculated on the basis of edges and noise components. It should be noted that the boundary area includes a boundary between the background region and the person area. The less the high-frequency components in the entire background area are, the higher the evaluation value $E_{BOKE}$ becomes. This is because when the high-frequency components are less, it is considered that the background is blurred more gently.

Figure 12:
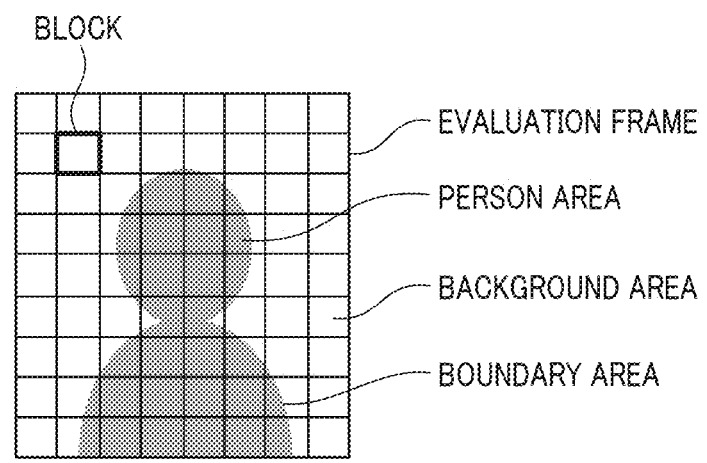
FIG. 12 is a view for describing a configuration of an evaluation frame in the embodiment.

The color-luminance evaluation value $E_{CY}$ is calculated on the basis of a color dispersion value of block-color-component averages of the blocks belonging to the background area of the evaluation frame A and a luminance dispersion value of block-luminance-component averages of the blocks belonging to the background area of the evaluation frame A. A block-color-component average is an average of color components of pixels in a block. A block-luminance-component average of a block is an average of luminance components of pixels of the block. The less the color dispersion value of the block-color-component averages and the luminance dispersion value of the block-luminance-component averages are, the higher the color-luminance evaluation value $E_{CY}$ is. When the dispersion values are less, it is considered that unevenness of color and luminance are less and that the background is blurred more gently. The optimal-object-position detection unit 106 calculates the defocus-amount evaluation value $E_{BOKE}$ by executing a defocus-amount-evaluation-value calculation process in FIG. 13 and calculates the color-luminance evaluation value $E_{CY}$ by executing a color-luminance-evaluation-value calculation process in FIG. 15 mentioned later. In the defocus-amount-evaluation-value calculation process and color-luminance-evaluation-value calculation process, the evaluation frame A is divided into a plurality of blocks as shown in FIG. 12.

Figure 13:
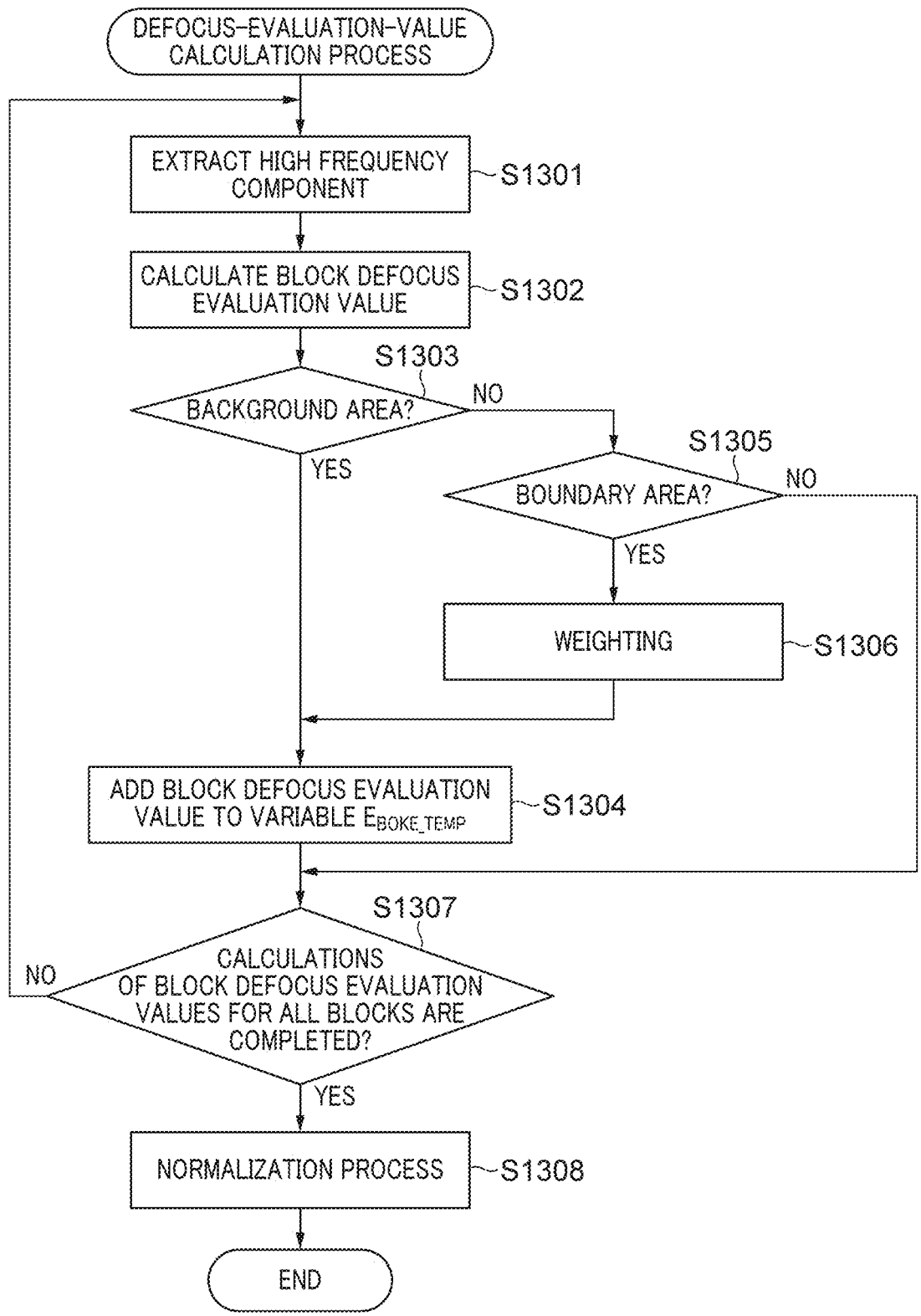
FIG. 13 is a flowchart showing procedures of a defocus-amount-evaluation-value calculation process executed by the optimal-object-position detection unit in FIG. 1.

FIG. 13 is a flowchart showing procedures of the defocus-amount-evaluation-value calculation process executed by the optimal-object-position detection unit 106 in FIG. 1.

Figure 14:
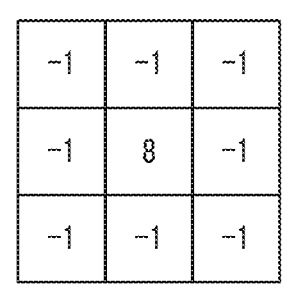

In the defocus-amount-evaluation-value calculation process, the optimal-object-position detection unit 106 clears a variable $E_{BOKE\_TEMP}$ for calculating defocus-amount evaluation value $E_{BOKE}$ to 0 first. Next, the optimal-object-position detection unit 106 specifies one block from among the plurality of blocks included in the evaluation frame A. In a step S1301, the optimal-object-position detection unit 106 extracts high-frequency components EH by applying an edge extraction filter as shown in FIG. 14 to luminance components of all pixel values in the specified block. Next, in a step S1302, the optimal-object-position detection unit 106 calculates a block-defocus-amount evaluation value $E_{BOKE\_1BLK}$, which is a defocus-amount evaluation value for one block, from the extracted high-frequency components EH by the following formula (2).

$$E_{BOKE\_1BLK}=K \cdot (P_{NUM}/\Sigma E_H) \quad (2)$$

In the formula, K is a defocus-amount conversion coefficient. In the embodiment, the defocus-amount conversion coefficient is set to a fixed value irrespective of the object distance d and the position of the evaluation frame A. $P_{NUM}$ is the number of pixels in the specified block. $\Sigma E_H$ is an integrated result of the high-frequency components in the specified block. Next, in a step S1303, the optimal-object-position detection unit 106 determines whether the specified block belongs to the background area.

When it is determined that the specified block belongs to the background area in the step S1303, the optimal-object-position detection unit 106 proceeds with the process to a step S1304. In the step S1304, the optimal-object-position detection unit 106 adds the block-defocus-amount evaluation value $E_{BOKE\_1BLK}$ to the variable $E_{BOKE\_TEMP}$. Next, the optimal-object-position detection unit 106 proceeds with the process to a step S1307 mentioned later.

When it is determined that the specified block does not belong to the background area in the step S1303, the optimal-object-position detection unit 106 proceeds with the process to a step S1305. Next, in the step S1305, the optimal-object-position detection unit 106 determines whether the specified block belongs to the boundary area.

When it is determined that the specified block belongs to the boundary area in the step S1305, the optimal-object-position detection unit 106 proceeds with the process to the step S1307. That is, when the specified block belongs to neither the background region nor the boundary region, the block-defocus-amount evaluation value $E_{BOKE\_1BLK}$ calculated in the step S1302 is not added to the variable $E_{BOKE\_TEMP}$.

When it is determined that the specified block belongs to the boundary area in the step S1305, the optimal-object-position detection unit 106 proceeds with the process to a step S1306. In the step S1306, the optimal-object-position detection unit 106 weights the block-defocus-amount evaluation value $E_{BOKE\_1BLK}$ with a coefficient larger than 1. Next, the optimal-object-position detection unit 106 proceeds with the process to the step S1304. In the step S1304, the block-defocus-amount evaluation value $E_{BOKE\_1BLK}$ that is weighted in the step S1306 is added to the variable $E_{BOKE\_TEMP}$. In this way, the variable $E_{BOKE\_TEMP}$ includes the block-defocus-amount evaluation values $E_{BOKE\_1BLK}$ of only the blocks belonging to either of the background area or the boundary area among all the blocks constituting the evaluation frame A in the embodiment.

Next, the optimal-object-position detection unit 106 determines, in the step S1307, whether calculations of the block-defocus-amount evaluation values $E_{BOKE\_1BLK}$ for all the blocks included in the evaluation frame A have been completed.

When it is determined, in the step S1307, that a calculation of the block-defocus-amount evaluation value $E_{BOKE\_1BLK}$ of any block included in the evaluation frame A has not been completed, the optimal-object-position detection unit 106 specifies another block from among the blocks included in the evaluation frame A. The other block is a block of which the block-defocus-amount evaluation value $E_{BOKE\_1BLK}$ has not been calculated. Then, the optimal-object-position detection unit 106 returns the process to the step S1301. When it is determined, in the step S1307, that the calculations of the block-defocus-amount evaluation values $E_{BOKE\_1BLK}$ of all the blocks included in the evaluation frame A have been completed, the optimal-object-position detection unit 106 proceeds with the process to a step S1308.

In the step S1308, the optimal-object-position detection unit 106 performs a normalization process. Specifically, the optimal-object-position detection unit 106 calculates the defocus-amount evaluation value $E_{BOKE}$ by dividing the variable $E_{BOKE\_TEMP}$ by the sum $N_B$ of the number of the blocks belonging to the background region and the number of the blocks belonging to the boundary area as shown in the following formula (3).

$$E_{BOKE} = E_{BOKE\_TEMP}/N_B \tag{3}$$

Then, the optimal-object-position detection unit 106 finishes the defocus-amount-evaluation-value calculation process.

FIG. 15 is a flowchart showing procedures of the color-luminance-evaluation-value calculation process executed by the optimal-object-position detection unit 106 in FIG. 1.

In the color-luminance-evaluation-value calculation process, the optimal-object-position detection unit 106 calculates a block-color-component average $C_{BA}(n)$ and a block-luminance-component average $Y_{BA}(n)$ for each of the blocks belonging to the background in a step S1501. It should be noted that the sign n denotes a block number of a block belonging to the background area. Next, in a step S1502, the optimal-object-position detection unit 106 calculates a total-color-component average $C_{AVE}$ of all the blocks belonging to the background area using the following formula (4) and calculates a total-luminance-component average $Y_{AVE}$ of all the blocks belonging to the background area using the following formula (5). It should be noted that the sign N is the number of the blocks belonging to the background area.

$$Y_{AVE} = \frac{1}{N}\sum_{n=1}^{N} Y_{BA}(n) \tag{4}$$

$$C_{AVE} = \frac{1}{N}\sum_{n=1}^{N} C_{BA}(n) \tag{5}$$

Next, in a step S1503, the optimal-object-position detection unit 106 calculates the color dispersion value $C_D$ of the color components and the luminance dispersion value $Y_D$ of the luminance components in the entire background area using the following formulas (6) and (7), respectively.

$$Y_D = \frac{1}{N}\sum_{n=1}^{N} \{Y_{BA}(n) - Y_{AVE}\}^2 \tag{6}$$

$$C_D = \frac{1}{N}\sum_{n=1}^{N} \{C_{BA}(n) - C_{AVE}\}^2 \tag{7}$$

Next, in a step S1504, the optimal-object-position detection unit 106 calculates the color-luminance evaluation value $E_{CY}$ using the following formula (8).

$$E_{CY} = K_Y/Y_D + K_C/C_D \tag{8}$$

In the formula, the weighting coefficients $K_C$ and $K_Y$ are conversion coefficients for adjusting weights for the evaluation values of the color component and luminance component, respectively. In the embodiment, the weighting coefficients $K_C$ and $K_Y$ are set to fixed values irrespective of the object distance d and the position of the evaluation frame A. When the color-luminance evaluation value $E_{CY}$ is calculated, the optimal-object-position detection unit 106 finishes the color-luminance-evaluation-value calculation process. Next, the optimal-object-position detection unit 106 calculates the background defocus evaluation value E using the following formula (9) by adding the defocus-amount evaluation value $E_{BOKE}$ and color-luminance evaluation value $E_{CY}$.

$$E = E_{BOKE} + E_{CY} \tag{9}$$

The optimal-object-position detection unit 106 calculates the background defocus evaluation values E of the evaluation frames A of the defocus background images corresponding to the respective object distances d. Moreover, the optimal-object-position detection unit 106 calculates the background defocus evaluation value E for every position of the evaluation frame A in the defocus background image of each object distance d while shifting the evaluation frame A horizontally. In this way, the plurality of background defocus evaluation values E of which the object distance d and the position of the evaluation frame A differ are calculated in the embodiment. The optimal-object-position detection unit 106 determines that the combination of the object distance d and the position of the evaluation frame of which the background defocus evaluation value E is largest among the calculated background defocus evaluation values is the optimal object position.

Returning back to FIG. 6, the optimal-object-position detection unit 106 notifies the user of the information about the optimal object position in a step S604. Specifically, the optimal-object-position detection unit 106 displays a superimposed image that superimposes the object model 401, object distance information 402, and image-pickup field angle 403 on the preliminary pickup image as shown in FIG. 4 on the display unit 108 on the basis of the optimal object position, the determined object distance d, and the determined position of the evaluation frame A. Moreover, the optimal-object-position detection unit 106 generates an image-pickup assumption image 404 by superimposing the person area corresponding to the above-mentioned object model 401 on the image of the evaluation frame A determined as the optimal object position and displays the image-pickup assumption image 404 concerned on the display unit 108.

At this occasion, the superimposed image and image-pickup assumption image 404 may be separately displayed on divided areas of the screen of the display unit 108. Alternatively, the image-pickup assumption image 404 may be superimposed on the superimposed image. Moreover, the superimposed image and image-pickup assumption image 404 may be switchably displayed by a predetermined user's operation. Furthermore, what is called a live view image picked up in real time may be displayed with the superimposed image or the preliminary pickup image. Also in this case, the images may be separately displayed on divided area of the display unit, one image may be superimposed on another image, or the images may be switchably displayed by a predetermined user's operation.

Moreover, the object model 401, object distance information 402, and image-pickup field angle 403 may be superimposed on the live view image. In this case, the object model 401, object distance information 402, and image-pickup field angle 403 are superimposed on the live view image so as to match coordinates of the object model 401 in a preliminary pickup image, object distance information 402, and image-pickup field angle 403 in the preliminary pickup image. According to this display process, the user can guide the person who becomes the object to the suitable position more easily. After that, the optimal-object-position detection process is finished.

When the object or the field angle is greatly changed after notifying the user of the information about the optimal object position, the image that is currently picking up differs from the preliminary pickup image greatly. In this case, warning may be reported to the user of or guidance that recommends to redo preliminary image pickup may be displayed. Change of the image can be specified on the basis of difference between histogram of the image that is currently picking up and histogram of the preliminary pickup image, for example.

According to the above-mentioned embodiment, the plurality of defocus background images that simulate the defocus states of the background in picking up the object at the different object distances d are generated based on the preliminary pickup image. The evaluation frames A are respectively set in the defocus background images, the background defocus evaluation values E of the respective evaluation frames A are calculated, and the information about the optimal object position is reported on the basis of the background defocus evaluation values E. The user performs main image pickup after guiding the person who becomes the object to the optimal object position on the basis of this information. Thereby, even if a user is a beginner who has little knowledge and experience in the image pickup, the user can pick up an image that effectively blurs background easily.

Moreover, the defocus function PSF of which the coefficient depends on the object distance d and background distance D is used for every pixel position constituting the preliminary pickup image in generating the defocus background image in the above-mentioned embodiment. Thereby, the defocus background image corresponding to the object distance d and background distance D can be generated.

Since the object is a person in the above-mentioned embodiment, a portrait image that effectively blurs background can be picked up easily.

In the above-mentioned embodiment, when the object distance d is a first distance (for example, 1 m), a person area in which the ratio of a person's face becomes dominant is set in the evaluation frame A. When the object distance d is a second distance (for example, 5 m) longer than the first distance, the person area where an upper half of the person is included is set in the evaluation frame A. When the object distance d is a third distance (for example, 10 m) longer than the second distance, the person area where the whole body of the person is included is set in the evaluation frame A. Thereby, the process that estimates an actual image pickup about the boundary between the background area and person area can be performed.

In the above-mentioned embodiment, the defocus-amount evaluation value $E_{BOKE}$ is calculated on the basis of the high-frequency luminance components extracted from the blocks belonging to the background area and the high-frequency luminance components extracted from the blocks belonging to the boundary area in the evaluation frame A. Thereby, the evaluation result about whether the background blurs gently in the background area and boundary area in the evaluation frame A can be reflected to the defocus-amount evaluation value $E_{BOKE}$.

In the above-mentioned embodiment, the defocus-amount evaluation value $E_{BOKE}$ is calculated by weighting the boundary area in the evaluation frame A with a weighting value larger than that for the background area. Thereby, the evaluation value in a case that there are the high-frequency components around the person, i.e., in a case that there is an object that disturbs the person, can be set low, which can avoid the failure case as shown in FIG. 5B.

In the above-mentioned embodiment, the color-luminance evaluation value $E_{CY}$ is calculated on the basis of the dispersion value of the color components and the dispersion value of the luminance components in the background area in the evaluation frame A. Thereby, the evaluation result about whether the background blurs gently without unevenness of color and luminance in the background area in the evaluation frame A can be reflected to the color-luminance evaluation value $E_{CY}$.

In the above-mentioned embodiment, the background defocus evaluation value E is calculated for every position of the evaluation frame A in the defocus background image of each object distance d while shifting the evaluation frame A horizontally. Thereby, the object position where the person is not disturbed in the same object distance d and where an impression of a picture becomes better can be detected.

In the above-mentioned embodiment, the object model 401 and object distance information 402 are superimposed on the preliminary pickup image on the basis of the information about the evaluation frame A having the highest background defocus evaluation value E. Thereby, even if a user is a beginner who has little knowledge and experience in the image pickup, the user can guide the person who becomes the object to the object position at which the defocus state becomes optimal.

In the above-mentioned embodiment, the image-pickup assumption image 404 assuming a case that an image is picked up at the optimal object position is displayed. Thereby, the user can know the composition and the defocus state of the background in the case that an image is picked up at the optimal object position before the main image pickup.

In the above-mentioned embodiment, the preliminary pickup image is generated by picking up the periphery of the image pickup target position using the wide angle side of the zoom lens. Moreover, the size of the evaluation frame is set on the basis of the image-pickup field angle corresponding to the focal length of the zoom lens. That is, the image is picked up while optimizing lens performance using optical information. This prevents image quality degradation near the boundary between the person area and the background area that will be generated in a case that the background is blurred by an image processing application after the image pickup. And the high quality image can be generated.

Although the present invention has been described using the above-mentioned embodiment, the present invention is not limited to the above-mentioned embodiment. For example, the present invention can be applied to image pickup of an object other than a person.

Moreover, when a plurality of focal lengths are taken into consideration in addition to the telephoto end of the lens in setting the evaluation frame, the user can be notified of candidates of more optimal object positions. Since the focal length is fixed to the telephoto end of the zoom lens in the step S602 in FIG. 6 mentioned above, the size of the evaluation frame is uniquely determined for each object distance. As compared with this, the defocus background image may be evaluated using a plurality of evaluation frames A for each object distance.

FIG. 16 shows examples of the evaluation frames A and the person areas B in cases that the object distances d are 1 m, 5 m, and 10 m and the focal lengths f are 70 mm (telephoto end), 50 mm, and 24 mm (wide-angle end). Since the image-pickup field angle becomes large as the focal length becomes short, the size of the evaluation frame becomes large. At the wide-angle end, since the evaluation frame A coincides with the image-pickup field angle of the preliminary pickup image, only one pattern is calculated as the evaluation value.

When the plurality of focal lengths are taken into consideration in addition to the telephoto end of the lens in setting the evaluation frame, more optimal object positions can be provided. When the candidates of the plurality of optimal object positions are displayed, the user can select a favorite object position. For example, when there is an off-limits area like a road around one optimal object position, the user avoids this candidate and selects an optimal object position from the other candidates.

In the above-mentioned embodiment, although the case that the present invention is applied to the digital camera having the zoom lens is described, the present invention is not restricted to this configuration. The present invention may be applied to a digital camera having a fixed focal length lens. When the digital camera having the fixed focal length lens is used, a preliminary pickup image is obtained using a panorama image pickup mode in the step S201 mentioned above.

In the image pickup using the panorama image pickup mode, a preliminary pickup image is generated by combining a plurality of images picked up while the user turns the camera vertically or horizontally. The panorama image pickup mode is a function mounted in a general digital camera. The optimal-object-position detection process in FIG. 6 mentioned above is executed using this preliminary pickup image. In this case, the evaluation frame is set on the basis of the image-pickup field angle of not using the panorama image pickup mode in the step S602, and the defocus background image is evaluated. In this way, the effect similar to the above-mentioned embodiment can be produced also in the digital camera having the fixed focal length lens by using the panorama image pickup mode.

It should be noted that the digital camera of the embodiment may be constituted so that the user can set ON/OFF of the calculation of the optimal object position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-024477, filed Feb. 18, 2021, No.

2021-146277, filed Sep. 8, 2021, and No. 2021-207218, filed Dec. 21, 2021, which are hereby incorporated by reference herein in their entireties.

What is claimed is:

1. An image pickup apparatus comprising:
at least one processor and/or circuit configured to function as following units;
a generation unit configured to generate simulation images that simulate defocus states of background in cases that an object is picked up at different object distances based on a preliminary pickup image generated by picking up the background without including the object;
a setting unit configured to set evaluation frames to the simulation images, respectively;
a calculation unit configured to calculate defocus-state evaluation values of the evaluation frames; and
a notification unit configured to notify of information about an object position at which the defocus state becomes optimal based on the defocus-state evaluation values.

2. The image pickup apparatus according to claim 1, wherein the generation unit generates the simulation images using a defocus function of which a coefficient depends on an object distance and a background distance for every pixel position constituting the preliminary pickup image.

3. The image pickup apparatus according to claim 1, wherein the calculation unit divides each of the evaluation frames into blocks and calculates the defocus-state evaluation values based on defocus-amount evaluation values and color-luminance evaluation values calculated for the blocks, respectively.

4. The image pickup apparatus according to claim 3, wherein the object is a person.

5. The image pickup apparatus according to claim 4, wherein each of the evaluation frames includes a person area showing a person who is distant from the user by an object distance used for generating a simulation image in which the evaluation frame concerned is set,
wherein a person area in which the ratio of a person's face becomes dominant is set in the evaluation frame in a case where the object distance is a first distance,
wherein a person area where an upper half of the person is included is set in the evaluation frame in a case where the object distance is a second distance longer than the first distance, and
wherein a person area where a whole body of the person is included is set in the evaluation frame in a case where the object distance is a third distance longer than the second distance.

6. The image pickup apparatus according to claim 5, wherein the calculation unit calculates the defocus-amount evaluation value based on high-frequency luminance components extracted from blocks belonging to a background area in the evaluation frame and high-frequency luminance components extracted from blocks belonging to a boundary area including a boundary between the background region and the person area.

7. The image pickup apparatus according to claim 6, wherein the calculation unit calculate the defocus-amount evaluation value by weighting the boundary area in the evaluation frame with a weighting value larger than that for the background area.

8. The image pickup apparatus according to claim 3, wherein the calculation unit calculates the color-luminance evaluation value based on a dispersion value of color components and a dispersion value of luminance components in a background area in the evaluation frame.

9. The image pickup apparatus according to claim 1, wherein the calculation unit calculates the defocus-state evaluation value of the evaluation frame for every position of the evaluation frame while shifting the evaluation frame horizontally in the simulation image of each object distance.

10. The image pickup apparatus according to claim 1, wherein the notification unit superimposes an object model that shows an object's standing position and a distance from the user to the object position on the preliminary pickup image based on information about the evaluation frame having the highest defocus-state evaluation value.

11. The image pickup apparatus according to claim 10, wherein the notification unit further displays an image-pickup assumption image assuming a case where the object is picked up at the object position at which the defocus state becomes optimal.

12. The image pickup apparatus according to claim 1, wherein the notification unit notifies of information about object positions as candidates selected by the user.

13. The image pickup apparatus according to claim 1, wherein the preliminary pickup image is generated by picking up a periphery of an image pickup target position using a wide angle side of a zoom lens.

14. The image pickup apparatus according to claim 13, wherein a size of the evaluation frame is set based on an image-pickup field angle corresponding to a focal length of the zoom lens.

15. The image pickup apparatus according to claim 1, wherein the preliminary pickup image is generated by picking up a periphery of an image pickup target position using a panorama image pickup mode.

16. A control method for an image pickup apparatus, the control method comprising:
generating a preliminary pickup image by picking up background without including an object;
generating simulation images that simulate defocus states of the background in cases that the object is picked up at different object distances based on the preliminary pickup image;
setting evaluation frames to the simulation images, respectively;
calculating defocus-state evaluation values of the evaluation frames; and
notifying of information about an object position at which the defocus state becomes optimal based on the defocus-state evaluation values.

17. A non-transitory computer-readable storage medium storing a control program causing a computer to execute a control method for an image pickup apparatus, the control method comprising:
generating a preliminary pickup image by picking up background without including an object;
generating simulation images that simulate defocus states of the background in cases that the object is picked up at different object distances based on the preliminary pickup image;
setting evaluation frames to the simulation images, respectively;
calculating defocus-state evaluation values of the evaluation frames; and
notifying of information about an object position at which the defocus state becomes optimal based on the defocus-state evaluation values.

18. An image pickup apparatus comprising:
a memory device that stores a set of instructions; and
at least one processor that executes the set of instructions to:
generate simulation images that simulate defocus states of background in cases that an object is picked up at different object distances based on a preliminary pickup image generated by picking up the background without including the object;
set evaluation frames to the simulation images, respectively;
calculate defocus-state evaluation values of the evaluation frames; and
notify of information about an object position at which the defocus state becomes optimal based on the defocus-state evaluation values.

* * * * *